Jan. 28, 1930.   J. J. BOLAND   1,744,743
PINION MECHANISM
Filed June 3, 1929
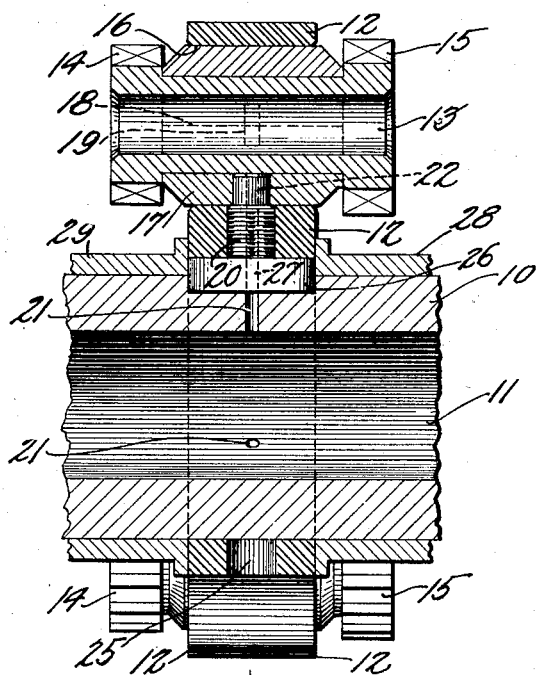
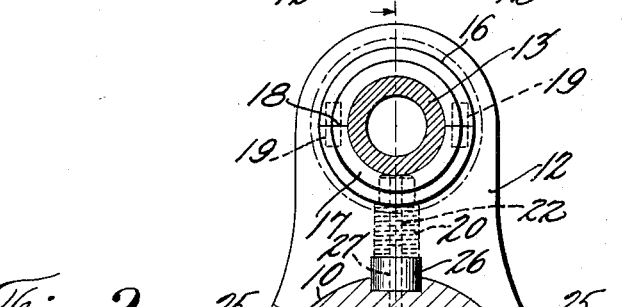
INVENTOR.
Joseph J. Boland
BY
ATTORNEY.

Patented Jan. 28, 1930

1,744,743

UNITED STATES PATENT OFFICE

JOSEPH J. BOLAND, OF KEYPORT, NEW JERSEY, ASSIGNOR, BY MESNE ASSIGNMENTS, TO UPPERCU-BURNELLI CORPORATION, A CORPORATION OF DELAWARE

PINION MECHANISM

Application filed June 3, 1929. Serial No. 367,938.

This invention relates to pinion mechanism and comprises an assemblage of planetary pinions mounted in a manner that is both new and novel.

An object of the invention is to so construct the pinions and mounting means that the parts may be readily and fully assembled into a compact unit before mounting on the usual drive shaft.

A further object of the invention is to provide a pinion mechanism of the type specified in which the construction is such, that when the same has once been fully assembled and mounted upon the drive shaft it will be impossible for the parts to become accidentally loosened or separated during operation.

A still further object of the invention is to provide a pinion mechanism of few parts in which the mounting means is of such construction that the individual pinion bearings may be amply and efficiently lubricated from the interior of the shaft on which they are mounted.

Various other objects and advantages of the invention will be in part obvious from an inspection of the accompanying drawings and a careful consideration of the following particular description and claims of one form of the invention.

In the drawings:

Figure 1 is a longitudinal section of the invention as taken on the line 1 of Fig. 2.

Figure 2 is an end view of the invention.

With reference to the drawings, 10 designates a drive shaft provided with a bore 11 in which is circulated a lubricant in a manner peculiar to internal combustion engines.

On this shaft is mounted a planetary pinion assemblage which comprises principally a spider 12 and a plurality of planets 13 on the ends of which are formed the pinions 14 and 15. It will be seen that the pinion 14 is of smaller diameter than the pinion 15 and that the bores 16 formed in the spider 12 are sufficiently large to pass the pinion 14 and to receive the pinion bushings 17 which forms the bearing.

These bushings are longitudinally divided on the line 18 and are held in proper alignment by the dowel pins 19. The bushings are held in fixed relation with the spider 12 by the headless screws 20 which are of such length as to be restrained against accidental retraction when mounted on the shaft. These screws have been longitudinally drilled so as to provide a passage 22 for the lubricant contained in the shaft 10 and which is extruded therefrom by means of the openings 21 which register with the drilled passages of the screws 20.

The assembling operation of this mechanism is conducted in the following manner:

The two halves of the bushings are first placed about the journal portions of the planets 13 and the whole passed by means of the pinion 14 into the bores 16 where they are secured by means of the screws 20 which are accessible through the openings 25 in the spider. This completed assemblage is now slipped upon the shaft 10 and is held in rotationally fixed relation therewith by a key 26 which is provided with a passage 27 so as to permit the lubricant to flow uninterruptedly at this point towards the bearing surface of the planets 13. The spider is held against axial movement on the shaft by the distance pieces 28 and 29.

It will readily be seen that the construction of this preferred embodiment is such that when once the parts have been assembled upon the shaft 10 it will be impossible for the same to become disassociated or even loosened during operation and that the lubricant can freely pass from the center of the shaft to the planet bearings by means of the passages through the shaft and screws.

Variations may be resorted to within the scope of the invention and portions of the improvements may be used without the others, whilst not departing from the spirit of the invention.

Having thus described my invention, I claim:

1. In a pinion mechanism, the combination with a shaft, of a spider adapted for engagement with the shaft and provided with a plurality of co-axial bores, a bushing for each bore, a planet having pinions rotatably mounted in each bushing; said bushings and planets together being axially slidable into and out of said bores, and a securing means for each planet and bushing adapted to prevent the removal thereof from the spider whilst said spider is engaged with the shaft.

2. In a pinion mechanism, the combination with a shaft, of a spider adapted for drivable engagement with the shaft and provided with a plurality of co-axial bores, a bushing for each bore said bushings being split longitudinally, a planet having pinions rotatably mounted in each bore by means of said bushings; said bushings and planets together being axially slidable into and out of said bores, and a screw-threaded securing means for each planet and bushing which is restrained against accidental retraction by the shaft when the spider is mounted thereon.

3. In a pinion mechanism, the combination with a drive shaft, of a spider adapted for engagement with the shaft and provided with a plurality of co-axial bores, a bushing for each bore; said bushings comprising two portions, means for holding said portions against relative movement, a planet having pinions rotatably mounted in each bushing; said bushings and planets together being axially slidable into and out of said bores, and a screw-threaded securing means for each planet adapted to extend radially of the spider into said bores in a manner as to engage said bushings.

4. In a pinion mechanism, the combination with a drive shaft having an axial bore for the circulation of a lubricant and radially disposed passages extending from said bore to the outer circumference thereof, of a spider rotatably engaged with the shaft and provided with a plurality of co-axial bores, a plurality of planets comprising an intermediate journal portion and a pinion at each end of said journal, a split bushing for each journal between said pinions; said bushings and planets together being axially slidable into and out of said bores, and a means for securing said bushings within the bores; said securing means being provided with an axial passage extending from the passages of said drive shaft to the journal portions of the planets.

5. In a pinion mechanism, the combination with a hollow drive shaft having radially disposed passages for the extrusion of a lubricant, of a spider rotatably engaged with the shaft and provided with a plurality of co-axial bores, a plurality of planets comprising an intermediate journal portion and a pinion at each end of said journal portion the one pinion being of lesser diameter than said bore, a two-piece bushing for each journal disposed between the pinions to provide a bearing for the planets within the bores, a screw means for each bushing; said screw means having an axial passage connecting with the passages of the shaft and adapted to prevent relative motion between the bushings and the spider.

Signed at Keyport, in the county of Monmouth and State of New Jersey this 28th day of May, 1929.

JOSEPH J. BOLAND.